United States Patent [19]

Tajima et al.

[11] Patent Number: 4,525,555
[45] Date of Patent: Jun. 25, 1985

[54] PROCESS FOR PREPARING POLYOLEFINS

[75] Inventors: Yoshio Tajima, Tokyo; Mituji Miyoshi, Fujisawa; Shoji Sugita, Kawasaki; Kiyoshi Kawabe, Yokohama; Kazuo Matsuura, Tokyo, all of Japan

[73] Assignee: Nippon Oil Company, Limited, Tokyo, Japan

[21] Appl. No.: 561,936

[22] Filed: Dec. 15, 1983

[30] Foreign Application Priority Data

Jan. 14, 1983 [JP] Japan ................................. 58-3558
Jan. 14, 1983 [JP] Japan ................................. 58-3559
Jan. 14, 1983 [JP] Japan ................................. 58-3560
Jan. 14, 1983 [JP] Japan ................................. 58-3561

[51] Int. Cl.³ .......................... C08F 4/44; C08F 10/04
[52] U.S. Cl. ................................. 526/125; 526/128; 526/133; 526/140; 526/141; 526/142; 526/348.6; 502/122; 502/124; 502/125
[58] Field of Search ............... 526/125, 128, 142, 133, 526/140, 141, 348.6

[56] References Cited

U.S. PATENT DOCUMENTS 4,085,276  4/1978  Toyota et al. ................. 526/125 X
4,382,019  5/1983  Greco ............................ 526/125 X
4,396,534  8/1983  Matsuura et al. ............. 526/125 X Primary Examiner—Paul R. Michl
Assistant Examiner—Fred M. Teskin
Attorney, Agent, or Firm—Stevens, Davis, Miller & Mosher

[57] ABSTRACT

Provided is a process for preparing a polyolefin, characterized by polymerizing at least one α-olefin in the presence of a catalyst which comprises the combination of:
[I] a solid catalyst component comprising a solid substance obtained by contacting the following components (1) through (3) with one another and (4) a titanium compound supported on said solid substance:
(1) a magnesium halide,
(2) a compound represented by the general formula

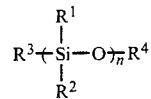

wherein $R^1$, $R^2$ and $R^3$ are each a hydrocarbon radical having 1 to 24 carbon atoms, an alkoxy group, hydrogen, or a halogen atom, $R^4$ is a hydrocarbon radical having 1 to 24 carbon atoms and n is $1 \leq n \leq 30$, and
(3) at least one compound selected from the group consisting of:
(a) compounds represented by the general formula

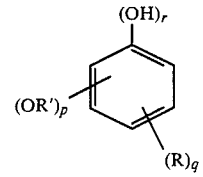

wherein R is hydrogen, a halogen atom, or a hydrocarbon radical having 1 to 24 carbon atoms, and r, p and q are integers satisfying the following conditions:

$1 \leq r \leq 3$, $0 \leq p < 6$, $0 \leq q < 6$, $1 \leq r+p+q < 6$, (b) alkyl phosphites,
(c)–(e) oxygen, nitrogen or sulfur-containing heterocyclic carboxylic acid esters,
(f) alkyl silanols,
(g) alkoxy borohalides,
(h) alkyl and/or alkoxy substituted sulfoxides, and
(i) N-substituted urethanes
[II] an organometallic compound; and
[III] a compound represented by the general formula

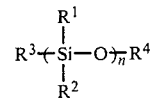

wherein $R^1$, $R^2$ and $R^3$ are each a hydrocarbon radical having 1 to 24 carbon atoms, an alkoxy group, hydrogen, or a halogen atom, $R^4$ is a hydrocarbon radical having 1 to 24 carbon atoms and n is $1 \leq n \leq 30$.

5 Claims, No Drawings

PROCESS FOR PREPARING POLYOLEFINS

BACKGROUND OF THE INVENTION

The present invention relates to a process for polymerizing or copolymerizing α-olefins in high activity and with high stereospecificity by using a novel catalyst.

Catalysts comprising titanium halides and organoaluminum compounds have heretofore been known as high stereospecific polymerization catalysts for α-olefins. However, although polymerizations using such known catalysts afford highly stereospecific polymers, it is necessary to remove the catalyst remaining in the resultant polymer because of a low catalytic activity.

Recently, various proposals have been made for improving the catalytic activity. According to those proposals, a high catalytic activity is attained when using a catalyst component which comprises an inorganic solid carrier such as, for example, $MgCl_2$ and titanium tetrachloride supported thereon.

In the preparation of polyolefins, however, it is preferable that the catalytic activity be as high as possible. From this standpoint, a catalyst of even higher activity has been desired. It is also important that the proportion of atactic portion in the resultant polymer be as small as possible.

SUMMARY OF THE INVENTION

It is the object of the present invention to provide a process for preparing highly stereospecific polyolefins in extremely high activity by using a novel catalyst.

According to the present invention, a polyolefin is prepared by polymerizing at least one α-olefin in the presence of a catalyst which comprises the combination of:

[I] a solid catalyst component comprising a solid substance obtained by contacting the following components (1) through (3) with one another and (4) a titanium compound supported on the solid substance:
(1) a magnesium halide,
(2) a compound represented by the general formula

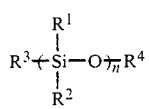

wherein $R^1$, $R^2$ and $R^3$ are each a hydrocarbon radical having 1 to 24 carbon atoms, an alkoxy group, hydrogen, or a halogen atom, $R^4$ is a hydrocarbon radical having 1 to 24 carbon atoms and n is $1 \leq n \leq 30$, and
(3) at least one compound selected from the group consisting of:
(a) compounds represented by the general formula

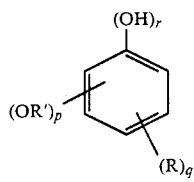

wherein R is hydrogen, a halogen atom, or a hydrocarbon radical having 1 to 24 carbon atoms, R' is a hydrocarbon radical having 1 to 24 carbon atoms, and r, p and q are integers satisfying the following conditions: $1 \leq r \leq 3$, $0 \leq p < 6$, $0 \leq q \leq 6$, $1 \leq r+p+q < 6$, (b) compounds represented by the general formula $P(OR^5)_3$ wherein $R^5$s, which may be alike or different, are each a hydrocarbon radical having 1 to 24 carbon atoms,
(c) oxygen-containing heterocyclic carboxylic acid esters,
(d) nitrogen-containing heterocyclic carboxylic acid esters,
(e) sulfur-containing heterocyclic carboxylic acid esters,
(f) compounds represented by the general formula $R^6_tSi(OH)_{4-t}$ wherein $R^6$ is a hydrocarbon radical having 1 to 24 carbon atoms and t is $1 \leq t \leq 3$,
(g) compounds represented by the general formula $B(OR^7)_uX_{3-u}$ wherein $R^7$ is a hydrocarbon radical having 1 to 24 carbon atoms, X is a halogen atom and u is $1 \leq u \leq 3$,
(h) compounds represented by the general formula $R^8_2SO_{w+1}$ wherein $R^8$s, which may be alike or different, are each a hydrocarbon radical having 1 to 24 carbon atoms or an alkoxy group and w is 0 or 1, and
(i) compounds represented by the general formula $R^9NHCOOR^9$ wherein $R^9$s, which may be alike or different, are each a hydrocarbon radical having 1 to 24 carbon atoms;

[II] an organometallic compound; and
[III] a compound represented by the general formula

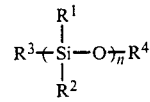

wherein $R^1$, $R^2$ and $R^3$ are each a hydrocarbon radical having 1 to 24 carbon atoms, an alkoxy group, hydrogen, or a halogen atom, $R^4$ is a hydrocarbon radical having 1 to 24 carbon atoms and n is $1 \leq n \leq 30$.

By using the catalyst of the present invention there can be obtained various effects, for example, the partial pressure of monomer during polymerization is low and the amount of the catalyst remaining in the resultant polymer after a short time polymerization is so small that the polyolefin manufacturing process can dispense with the catalyst removing step, and the proportion of atactic portion in the resultant polymer is very low.

PREFERRED EMBODIMENTS OF THE INVENTION

The method of obtaining the solid substance used in the invention by contacting and reacting the components (1), (2) and (3) is not specially limited. Those components may be reacted by contacting for usually 5 minutes to 20 hours under heating at a temperature in the range of 20° to 400° C., preferably 50° to 300° C., in the presence or absence of an inert solvent, or may be reacted by a co-pulverization treatment, or may be reacted by suitably combining these methods.

The order of reaction of the components (1) through (3) is not specially limited, either.

Inert solvents which may be used in the reaction are not specially limited. Usually, hydrocarbons and/or derivatives thereof which do not inactivate Ziegler type catalysts are employable, examples, of which include various saturated aliphatic hydrocarbons, aromatic hydrocarbons and alicyclic hydrocarbons such as propane, butane, pentane, hexane, heptane, octane, benzene, toluene, xylene and cyclohexane, as well as alcohols, ethers and esters such as ethanol, diethyl ether, tetrahydrofuran, ethyl acetate and ethyl benzoate.

The co-pulverization treatment is performed usually by the use of a ball mill, a vibration mill, a rod mill or an impact mill at a temperature in the range of 0° to 200° C., preferably 20° to 100° C., for 0.5 to 30 hours.

It is particularly preferable in the present invention that the solid substance be obtained by the co-pulverization treatment of the components (1) through (3).

The mixing ratio of the component (1), i.e. a magnesium halide, and the component (2), i.e. a a compound of the general formula

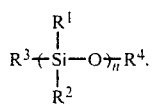

is in the range of 1:0.001 to 1:10, preferably 1:0.01 to 1:1, in terms of component (1): component (2) in mole ratio. The amount of the component (3) to be used is in the range of 1:0.001 to 1:10, preferably 1:0.01 to 1:1, in terms of component (1): component (3) in mole ratio.

Then, the component (4), i.e. a titanium compound, is supported on the thus-prepared solid carrier to obtain the solid catalyst component [I].

For supporting the titanium compound on the carrier there may be adopted a conventional method. For example, the solid carrier may be contacted with an excess titanium compound under heating in the presence or absence of a solvent. Preferably, both are heated to 50° to 300° C., preferably 80° to 150° C., in the presence of a solvent such as, for example, 1,2-dichloroethane. The reaction time is not specially limited, but usually it is not shorter than 5 minutes, and the contact treatment may be performed over a long period of time though not necessary. For example, the treating time may range from 5 minutes to 10 hours, preferably 1 to 4 hours. Of course, this treatment should be conducted in an oxygen- and moisture-free inert gas atmosphere. Means for removing unreacted titanium compound after the reaction is not specially limited. For example, the reaction mixture may be washed several times with a solvent which is inert to Ziegler type catalysts, followed by evaporation of the washings under reduced pressure, whereby a solid powder is obtainable. Alternatively, the solid carrier and a required amount of a titanium compound may be co-pulverized. The co-pulverization is performed at a temperature in the range of usually 0° to 200° C., preferably 20° to 100° C., for 0.5 to 30 hours, whereby the solid catalyst component used in the present invention can be prepared. Of course, the co-pulverizing operation should be performed in an inert gas atmosphere, and moisture should be avoided.

As the magnesium halide used as component (1) in the present invention, substantially anhydrous ones are employable, examples of which include magnesium fluoride, magnesium chloride, magnesium bromide, magnesium iodide, and mixtures thereof, with magnesium chloride being particularly preferred.

To exemplify the compound of the general formula

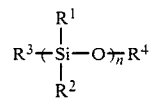

used as component (2) in the present invention, wherein $R^1$, $R^2$ and $R^3$ are each a hydrocarbon radical having 1 to 24, preferably 1 to 18, carbon atoms, an alkoxy group, hydrogen, or a halogen atom, $R^4$ is a hydrocarbon radical having 1 to 24, preferably 1 to 18, carbon atoms, and n is $1 \leq n \leq 30$, mention may be made of the following: monomethyltrimethoxysilane, monoethyltrimethoxysilane, monophenyltrimethoxysilane, monomethyltriethoxysilane, monomethyltri-n-butoxysilane, monomethyltri-secbutoxysilane, monomethyltriisopropoxysilane, monomethyltripentoxysilane, monomethyltrioctoxysilane, monomethyltristearoxysilane, monomethyltriphenoxysilane, dimethyldimethoxysilane, dimethyldiethoxysilane, dimethyldiisopropoxysilane, dimethyldiphenoxysilane, trimethylmonomethoxysilane, trimethylmonoethoxysilane, trimethylmonoisopropoxysilane, trimethylmonophenoxysilane, monomethyldimethoxymonochlorosilane, monomethyldiethoxymonochlorosilane, monomethylmonoethoxydichlorosilane, monomethyldiethoxymonobromosilane, monomethyldiphenoxymonochlorosilane, dimethylmonoethoxymonochlorosilane, monoethyltriethoxysilane, monoethyltriisopropoxysilane, monoethyltriphenoxysilane, diethyldimethoxysilane, diethyldiethoxysilane, diethyldiphenoxysilane, triethylmonomethoxysilane, triethylmonoethoxysilane, triethylmonophenoxysilane, monoethyldimethoxymonochlorosilane, monoethyldiethoxymonochlorosilane, monoethyldiphenoxymonochlorosilane, monoisopropyltrimethoxysilane, mono-n-butyltrimethoxysilane, mono-n-butyltriethoxysilane, mono-sec-butyltriethoxysilane, monophenyltriethoxysilane, diphenyldiethoxysilane, diphenylmonoethoxymonochlorosilane, monomethoxytrichlorosilane, monoethoxytrichlorosilane, monoisopropoxytrichlorosilane, monon-butoxytrichlorosilane, monopentoxytrichlorosilane, monooctoxytrichlorosilane, monostearoxytrichlorosilane, monophenoxytrichlorosilane, mono-p-methylphenoxytrichlorosilane, dimethoxydichlorosilane, diethoxydichlorosilane, diisopropoxydichlorosilane, di-n-butoxydichlorosilane, dioctoxydichlorosilane, trimethoxymonochlorosilane, triethoxymonochlorosilane, triisopropoxymonochlorosilane, tri-n-butoxymonochlorosilane, tri-sec-butoxymonochlorosilane, tetraethoxysilane, tetraisopropoxysilane, vinyltriethoxysilane, vinyltrimethoxysilane, vinyldimethoxymonochlorosilane, vinyldiethoxymonochlorosilane, vinylmethoxydichlorosilane, vinylethoxydichlorosilane, allyltrimethoxysilane, allyltriethoxysilane, allyldimethoxymonochlorosilane, allyldiethoxymonochlorosilane, allylmethoxydichlorosilane, allylethoxydichlorosilane, vinyltriphenoxysilane, vinylethoxydiphenoxysilane, allyltriphenoxysilane, allylethoxydiphenoxysilane, and chain-like or cyclic polysiloxanes having a repeating unit represented by the formula

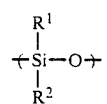

obtained by condensation of the above compounds. These compounds may be used in combination.

Among the compounds exemplified above as component (2), those wherein at least one substituent is an olefinic hydrocarbon radical are preferred. Particularly, vinyltrimethoxysilane, vinyltriethoxysilane, vinyltriphenoxysilane, allyltrimethoxysilane, allyltriethoxysilane and allyltriphenoxysilane are preferred.

As examples of the component [III] used in the present invention, those wherein at least one substituent is an aromatic hydrocarbon radical are preferred. Particularly, monophenyltrimethoxysilane and monophenyltriethoxysilane are preferred.

The following description is now provided about the component (3) used in the present invention.

First, as examples of compounds (a) of the general formula

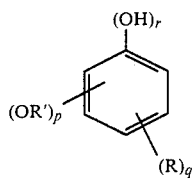

wherein R is hydrogen, a halogen atom, or a hydrocarbon radical having 1 to 24, preferably 1 to 18, carbon atoms, R' is a hydrocarbon radical having 1 to 24, preferably 1 to 18, carbon atoms, and r, p and q are integers satisfying the conditions of $1 \leq r \leq 3$, $0 \leq p < 6$, $0 \leq q < 6$, $1 \leq r+p+q < 6$, mention may be made of the following: phenol, 1-naphthol, 2-phenanthrol, 3-phenanthrol, anthranol, trimethylphenol, triethylphenol, 2-chlorophenol, 3-bromophenol, 4-chlorophenol, 2,6-dichlorophenol, di-t-butyl-p-cresol, 2-cyclohexylphenol, 2-allylphenol, 3-hydroxystyrene, isopropenylphenol, catechol, hydroquinone, 2,6-dihydroxytoluene, vinylcatechol, pyrogallol, methoxyphenol and 2-isopropoxyphenol, with phenol and 1-naphthol being particularly preferred.

As examples of compounds (b) of the general formula $P(OR^5)_3$ wherein $R^5$s, which may be alike or different, are each a hydrocarbon radical having 1 to 24, preferably 1 to 18, carbon atoms, mention may be made of the following: trimethyl phosphite, triethyl phosphite, tripropyl phosphite, triisopropyl phosphite, tri-n-butyl phosphite, triisobutyl phosphite, trivinyl phosphite, triallyl phosphite, triisodecyl phosphite, triphenyl phosphite, tricyclohexyl phosphite, tris(tert-amylphenyl) phosphite, tris(nonylphenyl) phosphite, tri(3,5-diethylphenyl) phosphite, trio-tolyl phosphite, tri-1-naphthyl phosphite, tris(2-ethylhexyl) phosphite, diphenylethyl phosphite, diphenylisopropyl phosphite, diphenylisobutyl phosphite, diphenylnonylphenyl phosphite, diphenylisodecyl phosphite, phenyldiisooctyl phosphite, phenyldiisodecyl phosphite and phenyldiisobutyl phosphite.

Oxygen-containing heterocyclic carboxylic acid esters (c), nitrogen-containing heterocyclic carboxylic acid esters (d) and sulfur-containing heterocyclic carboxylic acid esters (e) which may be used in the present invention are alkyl esters of carboxylic acids of five- to eight-membered rings containing as a ring constituent at least one atom selected from oxygen, nitrogen and sulfur.

As examples of oxygen-containing heterocyclic carboxylic acid esters (c), mention may be made of the following: furancarboxylic acid esters, dihydrofurancarboxylic acid esters, tetrahydrofurancarboxylic acid esters, benzofurancarboxylic acid esters, coumarancarboxylic acid esters, pyrancarboxylic acid esters, pyronecarboxylic acid esters, coumarincarboxylic acid esters and isocoumarincarboxylic acid esters. More concrete examples include methyl furan-2-carboxylate, ethyl furan-2-carboxylate, propyl furan-2-carboxylate, butyl furan-2-carboxylate, methyl furan-3-carboxylate, ethyl furan-3-carboxylate, butyl furan-3-carboxylate, methyl furan-2,3-dicarboxylate, methyl furan-2,4-dicarboxylate, methyl furan-2,5-dicarboxylate, methyl furan-3,4-dicarboxylate, methyl 4,5-dihydrofuran-2-carboxylate, ethyl 4,5-dihydrofuran-2-carboxylate, methyl tetrahydrofuran-2-carboxylate, methyl coumaran-2-carboxylate, ethyl coumaran-2-carboxylate, methyl coumarinate, ethyl coumarinate, methyl comanate, ethyl 3-methylfuran-2-carboxylate and ethyl isodehydroacetate.

As examples of nitrogen-containing heterocyclic carboxylic acid esters (d), mention may be made of the following: pyrrolecarboxylic acid esters, indolecarboxylic acid esters, carbazolecarboxylic acid esters, oxazolecarboxylic acid esters, imidazolecarboxylic acid esters, pyrazolecarboxylic acid esters, pyridinecarboxylic acid esters, phenanthridinecarboxylic acid esters, anthrazolinecarboxylic acid esters, phenanthrolinecarboxylic acid esters, naphthyridinecarboxylic acid esters, oxazinecarboxylic acid esters, thiazinecarboxylic acid esters, pyridazinecarboxylic acid esters, pyrimidinecarboxylic acid esters and pyrazinecarboxylic acid esters. More concrete examples include methyl pyrrole-2-carboxylate, ethyl pyrrole-2-carboxylate, propyl pyrrole-2-carboxylate, butyl pyrrole-2-carboxylate, methyl pyrrole-3-carboxylate, ethyl pyrrole-3-carboxylate, propyl pyrrole-3-carboxylate, butyl pyrrole-3-carboxylate, methyl pyridine-2-carboxylate, ethyl pyridine-2-carboxylate, propyl pyridine-2-carboxylate, butyl pyridine-2-carboxylate, amyl pyridine-2-carboxylate, methyl pyridine-3-carboxylate, ethyl pyridine-3-carboxylate, propyl pyridine-3-carboxylate, butyl pyridine-3-carboxylate, amyl pyridine-3-carboxylate, methyl pyridine-4-carboxylate, ethyl pyridine-4-carboxylate, propyl pyridine-4-carboxylate, butyl pyridine-4-carboxylate, amyl pyridine-4-carboxylate, methyl pyridine-2,3-dicarboxylate, ethyl pyridine-2,3-dicarboxylate, methyl pyridine-2,5-dicarboxylate, ethyl pyridine-2,5-dicarboxylate, methyl pyridine-2,6-dicarboxylate, ethyl pyridine-2,6-dicarboxylate, methyl pyridine-3,5-dicarboxylate, ethyl pyridine-3,5-dicarboxylate, methyl quinoline-2-carboxylate, ethyl quinoline-2-carboxylate, ethyl dimethylpyrrolecarboxylate, ethyl N-methylpyrrolecarboxylate, ethyl 2-methylpyridinecarboxylate, ethyl piperidine-4-carboxylate, ethyl piperidine-2-carboxylate and ethyl pyrrolidine-2-carboxylate.

As examples of sulfur-containing heterocyclic carboxylic acid esters (e), mention may be made of the following: thiophenecarboxylic acid esters, thianaphthenecarboxylic acid esters, isothianaphthenecarboxylic acid esters, benzothiophenecarboxylic acid esters, phenoxathiincarboxylic acid esters, thiaxanthenecarboxylic acid esters and thioindoxylcarboxylic acid esters. More concrete examples include methyl thiophene-2-carboxylate, ethyl thiophene-2-carboxylate, butyl thiophene-2-carboxylate, propyl thiophene-2-carboxylate, amyl thiophene-2-carboxylate, methyl thiophene-3-carboxylate, ethyl thiophene-3-carboxylate, propyl thiophene-3-carboxylate, butyl thiophene-3-carboxylate, amyl thiophene-3-carboxylate, methyl thiophene-2,3-dicarboxylate, ethyl thiophene-2,3-dicarboxylate, methyl thiophene-2,4-dicarboxylate, ethyl thiophene-2,4-dicarboxylate, methyl thiophene-2,5-dicarboxylate, ethyl thiophene-2,5-dicarboxylate, methyl 2-thienylacetate, ethyl 2-thienylacetate, propyl 2-thienylacetate, butyl 2-thienylacetate, amyl 2-thienylacetate, methyl 2-thienylacrylate, ethyl 2-thienylacrylate, methyl 2-thienylpyruvate, ethyl 2-thienylpyruvate, methyl thianaphthene-2-carboxylate, ethyl thianaphthene-2-carboxylate, methyl thianaphthene-3-carboxylate, ethyl thianaphthene-3-carboxylate, methyl thianaphthene-2,3-dicarboxylate, ethyl thianaphthene-2,3-dicarboxylate, methyl 3-hydroxy-2-thianaphthenecarboxylate, ethyl 3-hydroxy-2-thianaphthenecarboxylate, methyl 2-thianaphthenylacetate, ethyl 2-thianaphthenylacetate, methyl 3-thianaphthenylacetate, ethyl 3-thianaphthenylacetate, methyl benzothiophene-2-carboxylate, ethyl benzothiophene-2-carboxylate, methyl benzothiophene-3-carboxylate, ethyl benzothiophene-3-carboxylate, methyl benzothiophene-4-carboxylate, methyl benzothiophene-4-carboxylate, methyl phenoxathiin-1-carboxylate, ethyl phenoxathiin-1-carboxylate, methyl phenoxathiin-2-carboxylate, ethyl phenoxathiine-2-carboxylate, methyl phenoxathiin-3-carboxylate and ethyl phenoxathiin-3-carboxylate.

Among the compounds (c), (d) and (e), the compounds (c) are most preferred. Particularly, furancarboxylic acid esters and tetrahydrofurancarboxylic acid esters are preferred.

As examples of compounds (f) of the general formula $R^6_t Si(OH)_{4-t}$ wherein $R^6$ is a hydrocarbon radical having 1 to 24, preferably 1 to 18, carbon atoms and t is $1 \leq t \leq 3$, mention may be made of the following: trimethylsilanol, triethylsilanol, triisopropylsilanol, tri(n-butyl)silanol, tri(t-butyl)silanol, trioctylsilanol, tri(t-octyl)silanol, tricyclohexylsilanol, triphenylsilanol, tribenzylsilanol, tri(2-toluyl)silanol, dimethylsilanediol, diethylsilanediol, di(t-butyl)silanediol, dicyclohexylsilanediol, diphenylsilanediol and dinaphthylsilanediol.

As examples of compounds (g) of the general formula $B(OR^7)_u X_{3-u}$ wherein $R^7$ is a hydrocarbon radical having 1 to 24, preferably 1 to 18, carbon atoms, X is a halogen atom and u is $1 \leq u \leq 3$, mention may be made of the following: monomethoxydichloroboron, monoethoxydichloroboron, monoisopropoxydichloroboron, monooctoxydichloroboron, monostearoxydichloroboron, monophenoxydichloroboron, mono-p-methylphenoxydichloroboron, dimethoxymonochloroboron, diethoxymonochloroboron, diphenoxymonochloroboron, trimethoxyboron, triethoxyboron, triisopropoxyboron, tri-n-butoxyboron, triisobutoxyboron, triphenoxyboron and tri-p-methylphenoxyboron.

As examples of compounds (h) of the general formula $R^8_2 SO_{w+1}$ wherein $R^8$s, which may be alike or different, are each a hydrocarbon radical having 1 to 24, preferably 1 to 18, carbon atoms, or an alkoxy group, and w is 0 or 1, mention may be made of the following: dimethyl sulfoxide, diethyl sulfoxide, diisopropyl sulfoxide, di-n-butyl sulfoxide, diisoamyl sulfoxide, diphenyl sulfoxide, dibenzyl sulfoxide, dimethyl sulfone, diethyl sulfone, di-n-propyl sulfone, diisobutyl sulfone, diphenyl sulfone, dibenzyl sulfone, methyl phenyl sulfone, allyl benzyl sulfone, allyl phenyl sulfone, diethyl sulfite, di-n-propyl sulfite, diisoamyl sulfite, diphenyl sulfite, dimethyl sulfate, diisopropyl sulfate, distearyl sulfate and diphenyl sulfate.

As examples of compounds (i) of the general formula $R^9 NHCOOR^9$ wherein $R^9$s, which may be alike or different, are each a hydrocarbon radical having 1 to 24, preferably 1 to 18, carbon atoms, mention may be made of N-ethylurethane, N-isopropylurethane, N-n-butylurethane, N-n-hexylurethane, N-phenylurethane and N-benzylurethane.

Preferred examples of the titanium compound used as component (4) in the present invention are tetravalent and trivalent titanium compounds. As tetravalent titanium compounds, those of the general formula $Ti(OR)_n X_{4-n}$ are preferred wherein R is an alkyl, aryl or aralkyl group having 1 to 20 carbon atoms, X is a halogen atom and n is $0 \leq n \leq 4$. Examples are titanium tetrachloride, titanium tetrabromide, titanium tetraiodide, monomethoxytrichlorotitanium, dimethoxydichlorotitanium, trimethoxymonochlorotitanium, tetramethoxytitanium, monoethoxytrichlorotitanium, diethoxydichlorotitanium, triethoxymonochlorotitanium, tetraethoxytitanium, monoisopropoxytrichlorotitanium, diisopropoxydichlorotitanium, triisopropoxymonochlorotitanium, tetraisopropoxytitanium, monobutoxytrichlorotitanium, dibutoxydichlorotitanium, monopentoxytrichlorotitanium, monophenoxytrichlorotitanium, diphenoxydichlorotitanium, triphenoxymonochlorotitanium and tetraphenoxytitanium. As trivalent titanium compounds there may be used, for example, titanium trihalides obtained by reducing titanium tetrahalides such as titanium tetrachloride and titanium tetrabromide with hydrogen, aluminum, titanium or an organometallic compound of a metal selected from Groups I through III in the Periodic Table, as well as trivalent titanium compounds obtained by reducing tetravalent alkoxytitanium halides of the general formula $Ti(OR)_m X_{4-m}$ wherein R is an alkyl, aryl or aralkyl group having 1 to 20 carbon atoms, X is a halogen atom and m is $0 < m < 4$, with an organometallic compound of a metal selected from Groups I through III in the Periodic Table.

The amount of the titanium compound used in the present invention is not specially limited, but preferably it is adjusted so that the amount of the titanium compound contained in the resulting solid product is in the range of 0.5 to 20%, preferably 1 to 10%, by weight.

The organometallic compound used as component [II] in the present invention may be selected from organometallic compounds of Group I-IV metals in the Periodic Table. Above all, organoaluminum compounds and organozinc compounds are preferred. As examples thereof there may be mentioned organoaluminum compounds of the general formulae $R_3Al$, $R_2AlX$, $RAlX_2$, $R_2AlOR$, $RAl(OR)X$ and $R_3Al_2X_3$ wherein Rs, which may be alike or different, are each an alkyl or aryl group having 1 to 20 carbon atoms and X is a halogen atom, and organozinc compounds of the general formula $R_2Zn$ wherein Rs, which may be alike or different, are each an alkyl group having 1 to 20 carbon atoms. More concrete examples include triethylaluminum, triisopropylaluminum, triisobutylaluminum, tri-sec-butylaluminum, tri-tertbutylaluminum, trihexylaluminum, trioctylaluminum, diethylaluminum chloride, diisopropylaluminum chloride, ethylaluminum sesquichloride, diethylzinc, and mixtures thereof.

The component [III], i.e. a compound of the general formula

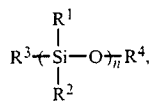

is used in an amount of 0.001 to 5 moles, preferably 0.01 to 2 moles, per mole of the organometallic compound. And its amount relative to the titanium compound in the solid catalyst component [I] is in the range of preferably 0.1:1 to 100:1, more preferably 0.3:1 to 20:1, in terms of Si:Ti ratio.

The organometallic compound as component [II] and the compound of the above general formula as component [III] may be reacted together and the reaction product may be used. In this reaction, the compound of component [III] is used in an amount of 0.001 to 2 moles, preferably 0.01 to 1 mole, per mole of the organometallic compound. The reaction product thus obtained is used in an amount of 0.1:1 to 100:1, preferably 0.3:1 to 20:1, in terms of Si:Ti ratio with respect to the titanium compound in the solid catalyst component [I].

The method for obtaining the reaction product of the organometallic compound and the compound of component [III] is not specially limited. For example, both may be contacted and thereby reacted at a temperature in the range of −50° to 400° C., preferably 50° to 250° C., for 5 minutes to 20 hours in the presence or absence of an inert solvent.

The amount of the organometallic compound used in the present invention is not specially limited, but usually it may range from 0.1 to 1,000 moles per mole of the titanium compound in the solid catalyst component [I].

The polymerization reaction using the catalyst of the present invention is carried out in the same way as in the conventional olefin polymerization reaction using a Ziegler type catalyst. That is, the reaction is conducted in vapor phase in a substantially oxygen- and water-free condition and in the presence of an inert solvent or by utilizing monomer per se as solvent. Olefin polymerizing conditions involve temperature ranging from 20° to 300° C., preferably 40° to 180° C., and pressures from atmospheric pressure to 70 kg/cm². G, preferably 2 to 60 kg/cm².G. Adjustment of the molecular weight can be made to some extent by changing polymerization conditions such as the polymerization temperature and the catalyst mole ratio, but the addition of hydrogen into the polymerization system is more effective for this purpose. Of course, using the catalyst of the present invention there can be performed, two or more multistage polymerization reactions involving different polymerization conditions such as different hydrogen concentrations and different polymerization temperatures.

The process of the present invention is applicable to the polymerization of all olefins that are polymerizable with Ziegler type catalysts. For example, it is suitable for the homopolymerization of α-olefins such as ethylene, propylene, butene-1 and 4-methylpentene-1, and random and block copolymerizations of ethylene/propylene, ethylene/butene-1 and propylene/butene-1. Copolymerization with dienes for the modification of polyolefins, for example, copolymerization of ethylene/butadiene and ethylene/1,4-hexadiene, is also preferable.

The process of the present invention is particularly effective in polymerizing or copolymerizing, with high stereospecificity, α-olefins having 3 to 8 carbon atoms.

The following examples are given to further illustrate the present invention, but it is to be understood that the invention is not limited thereto.

EXAMPLE 1

(a) Preparation of Solid Catalyst Component [I]

10 g. (105 mmol.) of anhydrous magnesium chloride, 1.52 g. (8 mmol.) of vinyltriethoxysilane and 1.51 g. (16 mmol.) of phenol were placed in a stainless steel pot having a content volume of 400 ml. and containing 25 stainless steel balls each ½ inch in diameter, and ball-milled for 24 hours at room temperature in a nitrogen atmosphere to give a solid powder. Then, 6 g. of the solid powder thus obtained, 30 ml. of titanium tetrachloride and 30 ml. of 1,2-dichloroethane were charged into a round-bottomed 200 ml. flask and stirred at 80° C. for 2 hours in a nitrogen atmosphere. After subsequent removal of excess titanium tetrachloride, the reaction mixture was washed with hexane to remove unreacted titanium tetrachloride, followed by drying under reduced pressure to obtain a solid catalyst component [I] containing 25 mg. of titanium per gram thereof.

(b) Polymerization

A 3-liter stainless steel autoclave equipped with an induction stirrer was purged with nitrogen and charged with 1,500 ml. of hexane, then 2.5 mmol. of triethylaluminum, 1.4 mmol. of phenyltriethoxysilane and 20 mg. of the above solid catalyst component [I] were added. Further, hydrogen was fed so as to give a partial pressure thereof in vapor phase of 0.05 kg/cm², and thereafter the temperature was raised to 50° C. with stirring. The system was pressurized to 0.5 kg/cm².G with the vapor pressure of hexane. Then, propylene was introduced to a total pressure of 7 kg/cm².G to start polymerization. The polymerization carried out for 2 hours while introducing propylene continuously to maintain the total pressure at 7 kg/cm².G.

After the polymerization, excess propylene was removed, followed by cooling, and then the contents were taken out and dried to give 220 g. of a white polypropylene. This amount was a total amount of product including an amorphous substance.

Catalytic activity was 850 g.polypropylene/g. solid.hr.C$_3$H$_6$ pressure, 34 kg.polypropylene/g.Ti.hr.C$_3$H$_6$ pressure. The percent residue (hereinafter referred to as "total II") of all polymer including the solventsoluble polymer after extraction in boiling n-heptane was 97.6 wt. %, and the melt flow index (hereinafter referred to as "MFI") was 8.1. Both catalytic activity and total II were higher than in the following Comparative Examples 1 and 2.

COMPARATIVE EXAMPLE 1

A solid catalyst component was prepared in the same way as in Example 1 except that the vinyltriethoxysilane was not used. Then, using the solid catalyst component thus obtained polymerization was carried out in the same manner as in Example 1 to give 151 g. of polypropylene. Catalytic activity was 580 g.polypropylene/g.solid.hr.C$_3$H$_6$ pressure. Total II and MFI were 80.4 wt. % and 8.3, respectively.

COMPARATIVE EXAMPLE 2

A solid catalyst component was prepared in the same way as in Example 1 except that phenol was not used.

Then, using the solid catalyst component thus obtained polymerization was carried out in the same manner as in Example 1 to give 16 g. of polypropylene. Catalytic activity was 60 g.polypropylene/g.solid.hr.$C_3H_6$ pressure, 2.6 kg.polypropylene/g.Ti.hr.$C_3H_6$ pressure. Total II and MFI were 87.0 wt. % and 7.5, respectively.

EXAMPLES 2–10

Solid catalyst components were prepared in the same way as in Example 1 except that the compounds shown in Table 1 were used. Then, using the solid catalyst components thus prepared polymerizations of propylene were carried out in the same manner as in Example 1, results of which are as set out in the same table.

diameter, and ball-milled for 20 hours at room temperature in a nitrogen atmosphere. The copulverized product was charged into a round-bottomed 300 ml. flask in a nitrogen atmosphere, then 50 ml. of titanium tetrachloride and 50 ml. of 1,2-dichloroethane were added and reaction was allowed to take place with stirring at 80° C. for 2 hours. The reaction mixture was washed with hexane to remove unreacted titanium tetrachloride and then dried under reduced pressure to obtain a solid catalyst component [I] containing 25 mg. of titanium per gram thereof.

(b) Polymerization

A 3-liter stainless steel autoclave equipped with an induction stirrer was purged with nitrogen and charged

TABLE 1

| | Solid Catalyst Component [I] | | | | | | Yield of Poly- propy- lene g | Catalytic Activity | | Total II wt. % | MFI |
|---|---|---|---|---|---|---|---|---|---|---|---|
| | Com- po- nent (1) | Component (2) | Compo- nent (3) | Com- po- nent (4) | Amount of Ti sup- ported mg | Component [II] | Component [III] | | *1 | *2 | | |
| Example 2 | MgCl$_2$ | CH$_2$=CHSi—(OC$_2$H$_5$)$_3$ | 1-naphthol | TiCl$_4$ | 23 | Al(C$_2$H$_5$)$_3$ | C$_6$H$_5$Si(OC$_2$H$_5$)$_3$ | 200 | 769 | 33.4 | 96.7 | 7.8 |
| Example 4 | " | CH$_2$=CHSi—(OC$_2$H$_5$)$_3$ | di-tert-butyl p-cresol | " | 22 | " | " | 176 | 677 | 30.7 | 96.4 | 7.6 |
| Example 5 | " | CH$_2$=CHSi—(OC$_2$H$_5$)$_3$ | o-allyl-phenol | " | 27 | " | " | 216 | 830 | 30.7 | 91.4 | 8.2 |
| Example 6 | " | CH$_2$=CHSi—(OC$_2$H$_5$)$_3$ | p-chloro-phenol | " | 30 | " | " | 198 | 761 | 25.4 | 93.2 | 7.4 |
| Example 7 | " | CH$_2$=CHSi—(OC$_2$H$_5$)$_3$ | p-methoxy-phenol | " | 30 | " | " | 168 | 646 | 21.5 | 94.8 | 7.9 |
| Example 8 | " | CH$_2$=CHSi—(OC$_2$H$_5$)$_3$ | p-hydroxy-styrene | " | 22 | " | " | 158 | 607 | 27.6 | 92.8 | 8.3 |
| Example 9 | " | CH$_2$=CHSi—(OC$_2$H$_5$)$_3$ | catechol | " | 19 | " | " | 130 | 500 | 26.3 | 95.3 | 8.0 |
| Example 10 | " | CH$_2$=CHSi—(OC$_2$H$_5$)$_3$ | hydro-quinone | " | 24 | " | " | 124 | 477 | 19.8 | 96.4 | 8.2 |

*1 Unit: g.polypropylene/g.solid.hr.$C_3H_6$ pressure
*2 Unit: g.polypropylene/g.Ti.hr.$C_3H_6$ pressure

EXAMPLE 11

A 3-liter stainless steel autoclave equipped with an induction stirrer was purged with nitrogen and charged with 1,500 ml. of hexane, then 2.5 mmol. of triethylaluminum and 1.4 mmol. of phenyltriethoxysilane were added and the temperature was raised to 80° C. with stirring to allow reaction to take place for 30 minutes. After subsequent cooling to room temperature, 20 mg. of the solid catalyst component prepared in Example 2 was added and hydrogen was introduced so as to give a partial pressure thereof in vapor phase of 0.05 kg/cm$^2$. Then, the temperature was raised to 50° C. with stirring. The system was pressurized to 0.5 kg/cm$^2$.G with the vapor pressure of hexane. Propylene was then introduced up to a total pressure of 7 kg/cm$^2$.G to start polymerization. Subsequent operations were the same as in Example 1. As a result, there was obtained 228 g. of polypropylene. Catalytic activity was 877 g.polypropylene/g.solid.hr.$C_3H_6$ pressure, 38.1 kg.polypropylene/g.Ti.hr. $C_3H_6$ pressure. Total II and MFI were 96.2 wt. % and 8.1, respectively.

EXAMPLE 12

(a) Preparation of Solid Catalyst Component [I]

10 g. (105 mmol.) of anhydrous magnesium chloride, 1.74 ml. (8.8 mmol.) of vinyltriethoxysilane and 1.2 ml. (4.6 mmol.) of triphenyl phosphite were placed in a stainless steel pot having a content volume of 400 ml. and containing 25 stainless steel balls each ½ inch in with 1,500 ml. of hexane, then 2.5 mmol. of triethylaluminum, 1.4 mmol. of phenyltriethoxysilane and 20 mg. of the above solid catalyst component [I] were added. Further, hydrogen was introduced so as to give a partial pressure thereof in vapor phase of 0.05 kg/cm$^2$, and thereafter the temperature was raised to 50° C. with stirring. The system was pressurized to 0.5 kg/cm$^2$.G with the vapor pressure of hexane. Propylene was then introduced up to a total pressure of 7 kg/cm$^2$.G to start olymerization. The polymerization was carried out for 2 hours while introducing propylene continuously to maintain the total pressure at 7 kg/cm$^2$.G.

After the polymerization, excess propylene was removed, followed by cooling, and then the contents were taken out and dried to give 219 g. of a white polypropylene. This amount was a total amount of product including an amorphous substance. Catalytic activity was 840 g.polypropylene/g.solid.hr.$C_3H_6$ pressure, 33.7 kg.polypropylene/g.Ti.hr.$C_3H_6$ pressure. Total II and MFI were 97.6 wt. % and 8.9, respectively. Both catalytic activity and total II were higher than in the following Comparative Example 3.

COMPARATIVE EXAMPLE 3

A solid catalyst component was prepared in the same way as in Example 12 except that vinyltriethoxysilane was not used. Then, using the solid catalyst component just prepared polymerization of propylene was carried out in the same manner as in Example 12 except that the solid catalyst component just prepared was used in an amount of 50 mg., results of which are as set out in Table 2.

EXAMPLES 13-17

Solid catalyst components were prepared in the same way as in Example 12 except that the phosphorus compounds shown in Table 2 were used in place of the triphenyl phosphite. Then, using these solid catalyst components polymerizations of propylene were carried out in the same manner as in Example 12, results of which are as shown in Table 2.

EXAMPLES 18-20

Solid catalyst components were prepared in the same way as in Example 12 except that the phosphorus compounds shown in Table 2 were used in place of the triphenyl phosphite. Then, polymerizations of propylene were carried out in the same manner as in Example 12 except that the solid catalyst components just prepared were used each in an amount of 50 mg., results of which are as shown in the same table.

COMPARATIVE EXAMPLE 4

A solid catalyst component was prepared in the same way as in Example 12 except that triphenyl phosphate was used in place of the triphenyl phosphite. Then, polymerization of propylene was carried out in the same manner as in Example 12 except that the solid catalyst component just prepared was used in an amount of 50 mg., results of which are as shown in Table 2.

EXAMPLE 21

A solid catalyst component was prepared in the same way as in Example 12 except that allyltriethoxysilane was used in place of the vinyltriethoxysilane. Then, using the solid catalyst component just prepared polymerization of propylene was carried out in the same manner as in Example 12, results of which are as shown in Table 2.

EXAMPLE 22

A 3-liter stainless steel autoclave equipped with an induction stirrer was purged with nitrogen and charged with 1,500 ml. of hexane, then 2.5 mmol. of triethylaluminum and 1.4 mmol. of phenyltriethoxysilane were added and the temperature was raised to 80° C. to allow reaction to take place for 30 minutes. Thereafter, the temperature was reduced to room temperature and 20 mg. of the solid catalyst component prepared in Example 14 was added, then hydrogen was introduced so as to give a partial pressure thereof of 0.05 kg/cm$^2$. Thereafter, the temperature was raised to 50° C. with stirring. Propylene was then introduced up to a total pressure of 7 kg/cm$^2$.G to start polymerization. Subsequent operations were the same as in Example 12, results of which are as shown in Table 2.

TABLE 2

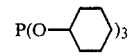

| | Solid Catalyst Component [I] | | | | |
|---|---|---|---|---|---|
| | Component (1) | Component (2) | Component (3) | Component (4) | Amount of Ti supported mg |
| Example 13 | MgCl$_2$ | CH$_2$=CHSi(OC$_2$H$_5$)$_3$ | C$_2$H$_5$OP(OC$_6$H$_5$)$_2$ | TiCl$_4$ | 32 |
| Example 14 | " | " | P(OiC$_4$H$_9$)$_3$ | " | 21 |
| Example 15 | " | " | C$_4$H$_9$OP(OC$_6$H$_5$)$_2$ | " | 33 |
| Example 16 | " | " | iC$_3$H$_7$OP(OC$_6$H$_5$)$_2$ | " | 36 |
| Example 17 | " | " | P(O—⟨⟩)$_3$ | " | 28 |
| Example 18 | " | " | P(OC$_2$H$_5$)$_3$ | " | 26 |
| Example 19 | " | " | C$_6$H$_5$OP(OiC$_4$H$_9$)$_2$ | " | 20 |
| Example 20 | " | " | P(OCH$_2$CH=CH$_2$)$_3$ | " | 23 |
| Example 21 | " | CH$_2$=CH—CH$_2$—Si(OC$_2$H$_5$)$_3$ | P(OC$_6$H$_5$)$_3$ | " | 31 |
| Example 22 | " | CH$_2$=CHSi(OC$_2$H$_5$)$_3$ | P(OiC$_4$H$_9$)$_3$ | " | 21 |
| Comparative Example 3 | " | — | P(OC$_6$H$_5$)$_3$ | " | 28 |
| Comparative Example 4 | " | CH$_2$=CHSi(OC$_6$H$_5$)$_3$ | OP(OC$_6$H$_5$)$_3$ | " | 32 |

| | Component [II] | Component [III] | Yield of Polypropylene g | Catalytic Activity *1 | *2 | Total II wt. % | MFI |
|---|---|---|---|---|---|---|---|
| Example 13 | Al(C$_2$H$_5$)$_3$ | C$_6$H$_5$Si(OC$_2$H$_5$)$_3$ | 211 | 810 | 25.4 | 95.1 | 7.2 |
| Example 14 | " | " | 117 | 450 | 21.4 | 95.9 | 8.9 |
| Example 15 | " | " | 198 | 760 | 23.1 | 95.4 | 7.3 |
| Example 16 | " | " | 175 | 670 | 18.7 | 95.8 | 7.0 |
| Example 17 | " | " | 103 | 400 | 14.1 | 96.6 | 7.7 |
| Example 18 | " | " | 178 | 270 | 10.5 | 96.3 | 8.5 |
| Example 19 | " | " | 142 | 220 | 11.0 | 95.5 | 8.1 |
| Example 20 | " | " | 167 | 260 | 11.3 | 96.3 | 8.5 |
| Example 21 | " | " | 160 | 620 | 19.8 | 97.0 | 8.3 |
| Example 22 | " | " | 131 | 500 | 25.2 | 95.6 | 8.4 |
| Comparative Example 3 | " | " | 166 | 260 | 9.1 | 86.6 | 8.6 |
| Comparative Example 4 | " | " | 63 | 100 | 3.0 | 94.7 | 11.0 |

*1 Unit: g · polypropylene/g · solid · hr · C$_3$H$_6$ pressure
*2 Unit: kg · polypropylene/g · Ti · hr · C$_3$H$_6$ pressure

EXAMPLE 23

(a) Preparation of Solid Catalyst Component [I]

10 g. (105 mmol.) of anhydrous magnesium chloride, 1.52 g. (8 mmol.) of vinyltriethoxysilane and 2.1 g. (16 mmol.) of ethyl furan-2-carboxylate were placed in a stainless steel pot having a content volume of 400 ml. and containing 25 stainless steel balls each ½ inch in diameter, and ball-milled for 24 hours at room temperature in a nitrogen atmosphere to give a solid powder.

A three-necked 300 ml. flask equipped with a condenser and an induction stirrer was purged nitrogen and then charged with 5 g. of the above solid place at 100° C. for 2 hours with stirring. After the reaction, excess titanium tetrachloride was removed by decantation and the reaction mixture was washed with hexane to remove unreacted titanium tetrachloride, then dried under reduced pressure to obtain a solid catalyst component [I] containing 16 mg. of titanium per gram thereof.

(b) Polymerization of Propylene

A 3-liter stainless steel autoclave was purged with nitrogen and charged with 1,500 ml. of hexane, then 2.5 mmol. of triethylaluminum, 1.4 mmol. of phenyltriethoxysilane and 20 mg. of the solid catalyst component [I] prepared above were added. Further, hydrogen was introduced so as to give a partial pressure thereof in vapor phase of 0.05 kg/cm$^2$, and then the temperature was raised to 50° C. with stirring. With the vapor pressure of hexane, the system was pressurized to 0.5 kg/cm$^2$.G. Propylene was then introduced up to a total pressure of 7 kg/cm$^2$.G to start polymerization. The polymerization was carried out for 2 hours while introducing propylene continuously to maintain the total pressure at 7 kg/cm$^2$.G.

After the polymerization, excess propylene was removed, followed by cooling, and then the contents were taken out and dried to give 110 g. of a white polypropylene. This amount was a total amount of product including an amorphous substance. Catalytic activity was 420 g.polypropylene/g.solid.hr.C$_3$H$_6$ pressure, 26.3 kg.polypropylene/g.Ti.hr.C$_3$H$_6$ pressure. Total II and MFI were 97.7 wt. % and 8.3, respectively. Both catalytic activity and total II were higher than in the following Comparative Example 5.

COMPARATIVE EXAMPLE 5

A solid catalyst component was prepared in the same way as in Example 23 except that the vinyltriethoxysilane was not used. Then, using this solid catalyst component polymerization of propylene was carried out in the same manner as in Example 23 to yield 85 g. of polypropylene. Catalytic activity was 330 g.polypropylene/g.solid.hr.C$_3$H$_6$ pressure, 13.8 kg.polypropylene/g.Ti.hr.C$_3$H$_6$ pressure. Total II and MFI were 89.6 wt. % and 8.0, respectively.

EXAMPLE 24

Polymerization of propylene was carried out in the same way as in Example 23 except that the amount of phenyltriethoxysilane used was changed to 0.5 mmol., to afford 130 g. of polypropylene. Catalytic activity was 500 g.polypropylene/g.solid.hr.C$_3$H$_6$ pressure, 27.8 kg. polypropylene/g.Ti.hr.C$_3$H$_6$ pressure. Total II and MFI were 96.8 wt. % and 7.3, respectively.

EXAMPLES 25-34

Solid catalyst components [I] were prepared in the same way as in Example 23 except that the compounds shown in Table 3 were used. Then, using these solid catalyst components polymerizations of propylene were carried out in the same manner as in Example 23, results of which are as shown in the same table.

TABLE 3

| | Solid Catalyst Component [I] | | | | |
|---|---|---|---|---|---|
| | Component (1) | Component (2) | Component (3) | Component (4) | Amount of Ti supported mg |
| Example 25 | MgCl$_2$ | CH$_2$=CHSi(OC$_2$H$_5$) | isoamyl furan-2-carboxylate | TiCl$_4$ | 21 |
| Example 26 | " | " | ethyl furan-2,3-dicarboxylate | " | 24 |
| Example 27 | " | " | ethyl coumarinate | " | 14 |
| Example 28 | " | " | ethyl tetrahydrofuran-2-carboxylate | " | 17 |
| Example 29 | " | " | ethyl thiophene-2-carboxylate | " | 22 |
| Example 30 | " | " | ethyl thiophene-2,5-carboxylate | " | 28 |
| Example 31 | " | " | ethyl pyridine-2-carboxylate | " | 30 |
| Example 32 | " | CH$_2$=CH—CH$_2$—Si(OC$_2$H$_5$)$_3$ | ethyl furan-2-carboxylate | " | 19 |
| Example 33 | " | CH$_2$=CH—CH$_2$—Si(OC$_2$H$_5$)$_3$ | ethyl thiophene-2-carboxylate | " | 24 |
| Example 34 | " | CH$_2$=CH—CH$_2$—Si(OC$_2$H$_5$)$_3$ | ethyl pyridine-2-carboxylate | " | 28 |

| | Component [II] | Component [III] | Yield of Polypropylene g | Catalytic Activity *1 | Catalytic Activity *2 | Total II wt. % | MFI |
|---|---|---|---|---|---|---|---|
| Example 25 | Al(C$_2$H$_5$)$_3$ | C$_6$H$_5$Si(OC$_2$H$_5$)$_2$ | 108 | 415 | 19.8 | 98.0 | 8.2 |
| Example 26 | " | " | 84 | 320 | 13.3 | 96.7 | 6.8 |
| Example 27 | " | " | 92 | 350 | 25.0 | 95.3 | 11.3 |
| Example | " | " | 123 | 470 | 27.6 | 94.8 | 10.1 |

TABLE 3-continued

| | | | | | | | |
|---|---|---|---|---|---|---|---|
| Example 28 | | | | | | | |
| Example 29 | " | " | 88 | 340 | 15.5 | 93.5 | 8.2 |
| Example 30 | " | " | 79 | 300 | 10.7 | 94.3 | 7.9 |
| Example 31 | " | " | 66 | 250 | 8.3 | 93.8 | 6.4 |
| Example 32 | " | " | 103 | 400 | 21.1 | 96.8 | 8.2 |
| Example 33 | " | " | 82 | 315 | 13.1 | 93.2 | 7.3 |
| Example 34 | " | " | 63 | 240 | 8.6 | 93.0 | 8.7 |

*1 Unit: g.polypropylene/g.solid.hr.$C_3H_6$ pressure
*2 Unit: kg.polypropylene/g.Ti.hr.$C_3H_6$ pressure

COMPARATIVE EXAMPLE 6

A solid catalyst component was prepared in the same way as in Example 23 except that diisobutyl phthalate was used in place of the ethyl furan-2-carboxylate. Then, using this solid catalyst component polymerization of propylene was carried out in the same manner as in Example 23, to give 46 g. of polypropylene. Catalytic activity was 180 g.polypropylene/g.solid.hr.$C_3H_6$ pressure, 4.6 kg.polypropylene/g.Ti.hr.$C_3H_6$ pressure. Total II and MFI were 95.1 wt. % and 8.2, respectively.

EXAMPLE 35

A 3-liter stainless steel autoclave equipped with an induction stirrer was purged with nitrogen and charged with 1,500 ml. of hexane, then 2.5 mmol. of triethylaluminum and 1.4 mmol. of phenyltriethoxysilane were added and the temperature was raised to 80° C. with stirring to allow reaction to take place for 30 minutes. Thereafter, the temperature was reduced to room temperature and 20 mg. of the solid catalyst component prepared in Example 23 was added, then hydrogen was introduced so as to give a partial pressure thereof in vapor phase of 0.05 kg/$cm^2$. Thereafter, the temperature was raised to 50° C. with stirring. With the vapor pressure of hexane, the system was pressurized to 0.5 kg/$cm^2$.G. Propylene was then introduced up to a total pressure of 7 kg/$cm^2$.G to start polymerization. Subsequent operations were the same as in Example 23. As a result, there was obtained 125 g. of polypropylene. Catalytic activity was 477 g.polypropylene/g.solid.hr.$C_3H_6$ pressure, 29.8 kg.polypropylene/g.Ti.hr.$C_3H_6$ pressure. Total II and MFI were 97.3 wt. % and 8.5, respectively.

EXAMPLE 36

(a) Preparation of Solid Catalyst Component [I]

10 g. (105 mmol.) of anhydrous magnesium chloride, 1.6 ml. (8 mmol.) of vinyltriethoxysilane and 4.4 g. (16 mmol.) of triphenylsilanol were placed in a stainless steel pot having a content volume of 400 ml. and containing 25 stainless steel balls each ½ inch in diameter, and ball-milled for 16 hours at room temperature in a nitrogen atmosphere. 5 g. of the co-pulverized product was charged into a round-bottomed 300 ml. flask in a nitrogen atmosphere, then 50 ml. of titanium tetrachloride and 50 ml. of 1,2-dichloroethane were added and reaction was allowed to take place with stirring at 80° C. for 2 hours. The reaction mixture was washed with hexane to remove unreacted titanium tetrachloride and then dried under reduced pressure to obtain a solid catalyst component [I] containing 26 mg. of titanium per gram thereof.

(b) Polymerization

A 3-liter stainless steel autoclave equipped with an induction stirrer was purged with nitrogen and charged with 1,500 ml. of hexane, then 2.5 mmol. of triethylaluminum, 1.4 mmol. of phenyltriethoxysilane and 30 mg. of the above solid catalyst component [I] were added. Further, hydrogen was introduced so as to give a partial pressure thereof in vapor phase of 0.05 kg/$cm^2$, and thereafter the temperature was raised to 50° C. with stirring. With the vapor pressure of hexane, the system was pressurized to 0.5 kg/$cm^2$.G. Propylene was then introduced up to a total pressure of 7 kg/$cm^2$.G to start polymerization. The polymerization was carried out for 2 hours while introducing propylene continuously to maintain the total pressure at 7 kg/$cm^2$.G.

After the polymerization, excess propylene was removed, followed by cooling, and then the contents were taken out and dried to give 164 g. of a white polypropylene. This amount was the total amount of product including an amorphous substance. Catalytic activity was 419 g.polypropylene/g.solid.hr $C_3H_6$ pressure, 16.1 kg.polypropylene/g.Ti.hr.$C_3H_6$ pressure. Total II and MFI were 94.2 wt. % and 7.3, respectively. Both catalytic activity and total II were higher than in the following Comparative Example 7.

COMPARATIVE EXAMPLE 7

A solid catalyst component was prepared in the same way as in Example 36 except that the vinyltriethoxysilane was not used. Then, using this solid catalyst component polymerization of propylene was carried out in the same manner as in Example 36, results of which as shown in Table 4.

EXAMPLE 37

A solid catalyst component [I] was prepared in the same way as in Example 36 except that triphenoxyboron was used in place of the triphenylsilanol. Then, using this solid catalyst component polymerization of propylene was carried out in the same way as in Example 36, results of which are as shown in Table 4.

COMPARATIVE EXAMPLE 8

A solid catalyst component was prepared in the same way as in Example 37 except that the vinyltriethoxysilane was not used. Then, using this solid catalyst component polymerization of propylene was carried out in the same manner as in Example 37, results of which are as shown in Table 4.

EXAMPLE 38

A solid catalyst component [I] was prepared in the same way as in Example 36 except that diphenyl sulfone was used in place of the triphenylsilanol. Then, using this solid catalyst component polymerization of propylene was carried out in the same manner as in Example 36, results of which are as shown in Table 4.

COMPARATIVE EXAMPLE 9

A solid catalyst component was prepared in the same way as in Example 38 except that vinyltriethoxysilane was not used. Then, using this solid catalyst component polymerization of propylene was carried out in the same manner as in Example 38, results of which are as shown in Table 4.

EXAMPLE 39

A solid catalyst component [I] was prepared in the same way as in Example 36 except that N-phenylurethane was used in place of the triphenylsilanol. Then, using this solid catalyst component polymerization of propylene was carried out in the same manner as in Example 36, results of which are as shown in Table 4.

COMPARATIVE EXAMPLE 10

A solid catalyst component was prepared in the same way as in Example 39 except that the vinyltriethoxysilane was not used. Then, using this solid catalyst component polymerization of propylene was carried out in the same manner as in Example 39, results of which are as shown in Table 4.

EXAMPLES 40-43

Solid catalyst components [I] were prepared in the same way as in Example 36 except that the compounds shown in Table 4 were used. Then, using these solid catalyst components there were conducted polymerizations of propylene in the same manner as in Example 36, results of which are as shown in Table 4.

EXAMPLE 44

A solid catalyst component [I] was prepared in the same way as in Example 36 except that allyltriethoxysilane was used in place of the vinyltriethoxysilane. Then, using this solid catalyst component there was conducted polymerization of propylene in the same manner as in Example 36, results of which are as shown in Table 4.

EXAMPLE 45

A 3-liter stainless steel autoclave equipped with an induction stirrer was purged with nitrogen and charged with 1,500 ml. of hexane, then 1.5 mmol. of triethylaluminum and 0.84 mmol. of phenyltriethoxysilane were added and the temperature was raised to 80° C. with stirring to allow reaction to take place for 30 minutes. Thereafter, the temperature was reduced to room temperature and 30 mg. of the solid catalyst component [I] prepared in Example 42 was added, then hydrogen was introduced so as to give a partial pressure thereof in vapor phase of 0.05 kg/cm$^2$. Thereafter, the temperature was raised to 50° C. with stirring. With the vapor pressure of hexane, the system was pressurized to 0.5 kg/cm$^2$.G. Propylene was then introduced up to a total pressure of 7 kg/cm$^2$.G to start polymerization. Subsequent operations were the same as in Example 36. Results are as shown in Table 4.

TABLE 4

| | Solid Catalyst Component [I] | | | | |
|---|---|---|---|---|---|
| | Component (1) | Component (2) | Component (3) | Component (4) | Amount of Ti supported mg |
| Example 37 | MgCl$_2$ | CH$_2$=CHSi(OC$_2$H$_5$)$_3$ | B(OC$_6$H$_5$)$_3$ | TiCl$_4$ | 29 |
| Example 38 | " | " | (C$_6$H$_5$)$_2$SO$_2$ | " | 31 |
| Example 39 | " | " | C$_6$H$_5$NHCOOC$_2$H$_5$ | " | 27 |
| Example 40 | " | " | (t-C$_4$H$_9$)$_3$SiOH | " | 29 |
| Example 41 | " | " | B(OC$_2$H$_5$)$_3$ | " | 23 |
| Example 42 | " | " | (C$_6$H$_5$O)$_2$SO$_2$ | " | 25 |
| Example 43 | " | " | iC$_3$H$_7$NHCOOC$_2$H$_5$ | " | 21 |
| Example 44 | " | CH$_2$=CHCH$_2$—Si(OC$_2$H$_5$)$_3$ | (C$_6$H$_5$)$_3$SiOH | " | 23 |
| Example 45 | the solid catalyst component prepared in Example 42 | | | | |
| Comparative Example 7 | MgCl$_2$ | — | (C$_6$H$_5$)$_3$SiOH | TiCl$_4$ | 25 |
| Comparative Example 8 | " | — | B(OC$_6$H$_5$)$_3$ | " | 32 |
| Comparative Example 9 | " | — | (C$_6$H$_5$)$_2$SO$_2$ | " | 28 |
| Comparative Example 10 | " | — | C$_6$H$_5$NHCOOC$_2$H$_5$ | " | 30 |

| | Component [II] | Component [III] | Yield of polypropylene g | Catalytic Activity *1 | Catalytic Activity *2 | Total II wt. % | MFI |
|---|---|---|---|---|---|---|---|
| Example 37 | Al(C$_2$H$_5$)$_3$ | C$_6$H$_5$Si(OC$_2$H$_5$)$_3$ | 307 | 790 | 27 | 96.2 | 8.2 |
| Example 38 | " | " | 303 | 780 | 25 | 94.8 | 7.0 |
| Example 39 | " | " | 144 | 370 | 14 | 96.0 | 7.5 |
| Example 40 | " | " | 137 | 350 | 12 | 95.6 | 7.8 |
| Example 41 | " | " | 195 | 500 | 22 | 95.2 | 7.4 |
| Example 42 | " | " | 98 | 250 | 10 | 97.3 | 7.1 |
| Example 43 | " | " | 94 | 240 | 11 | 95.6 | 7.3 |
| Example 44 | " | " | 172 | 440 | 19 | 94.4 | 8.1 |
| Example 45 | " | " | 121 | 310 | 12 | 94.5 | 7.8 |
| Comparative Example 7 | " | " | 125 | 320 | 13 | 80.1 | 7.8 |
| Comparative Example 8 | " | " | 203 | 520 | 16 | 82.3 | 8.4 |

TABLE 4-continued

| | | | | | | |
|---|---|---|---|---|---|---|
| Comparative Example 9 | " | " | 98 | 250 | 8.9 | 83.5 | 7.2 |
| Comparative Example 10 | " | " | 77 | 200 | 6.7 | 80.5 | 8.0 |

*1 Unit: g.polypropylene/g.solid.hr.$C_3H_6$ pressure
*2 Unit: kg.polypropylene/g.Ti.hr.$C_3H_6$ pressure

What is claimed is:

1. A process for preparing a polyolefin, characterized by polymerizing at least one α-olefin in the presence of a catalyst which consists of the combination of:

a solid catalyst component consisting of a solid substance obtained by reacting the following components (1) through (3) with one another and (4) a titanium compound supported on said solid substance:

(1) a magnesium halide, (2) at least one member selected from the group consisting of vinyltrimethoxysilane, vinyltriethoxysilane, vinyltriphenoxysilane, allyltrimethoxysilane, allyltriethoxysilane and allyltriphenoxysilane, and (3) at least one compound selected from the group consisting of:

(a) compounds represented by the general formula

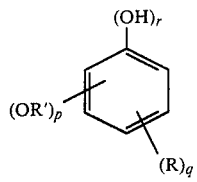

wherein R is hydrogen, a halogen atom, or a hydrocarbon radical having 1 to 24 carbon atoms, R' is a hydrocarbon radical having 1 to 24 carbon atoms, and r, p and q are integers satisfying the following conditions: $1 \leq r \leq 3$, $0 \leq p < 6$, $0 \leq q < 6$, $1 \leq r+p+q < 6$, (b) compounds represented by the general formula $P(OR^5)_3$ wherein $R^5$s, which may be alike or different, are each a hydrocarbon radical having 1 to 24 carbon atoms, (c) heterocyclic carboxylic acid esters containing oxygen as the hetero-atom;

(d) heterocyclic carboxylic acid esters containing nitrogen as the hetero-atom;

(e) heterocyclic carboxylic acid esters containing sulfur as the hetero-atom.

(f) compounds represented by the general formula $R^6{}_tSi(OH)_{4-t}$ wherein $R^6$ is a hydrocarbon radical having 1 to 24 carbon atoms and t is $1 \leq t \leq 3$, (g) compounds represented by the general formula $B(OR^7)_uX_{3-u}$ wherein $R^7$ is a hydrocarbon radical having 1 to 24 carbon atoms, X is a halogen atom and u is $1 \leq u \leq 3$, (h) compounds represented by the general formula $R^8{}_2SO_{w+1}$ wherein $R^8$s, which may be alike or different, are each a hydrocarbon radical having 1 to 24 carbon atoms or an alkoxy group and w is 0 or 1, and (i) compounds represented by the general formula $R^9NHCOOR^9$ wherein $R^9$s, which may be alike or different, are each a hydrocarbon radical having 1 to 24 carbon atoms;

an organoaluminum compound; and a compound selected from the group consisting of monophenyltrimethoxysilane and monophenyltriethoxysilane, wherein said solid substance is obtained by a co-pulverization at a temperature of 0-200 degrees C. for a time of 0.5 to 30 hours of said components (1), (2) and (3), wherein the ratio of said component (1) to said component (2) is in the range of 1:0.001 to 1:10 in mole ratio, wherein the ratio of said component (1) to said component (3) is in the range of 1:0.001 to 1:10 in terms of mole ratio, and wherein the amount of said compound relative to the titanium compound in said catalyst compnent is in the range of 0.1:1 to 100:1 in terms of Si:Ti ratio.

2. The process of claim 1, wherein the ratio of said organometallic compound to said compound is in the range of 1:0.001 to 1:5 in mole ratio.

3. The process of claim 1, wherein said organometallic compound and said compound are reacted together before use.

4. The process of claim 1, wherein the polymerization reaction is carried out at a temperature in the range of 20° to 300° C. and at a pressure in the range of atmospheric pressure to 70 kg/cm².G.

5. The process of claim 1, wherein said α-olefin is an α-olefin having 3 to 8 carbon atoms.

* * * * *